US011609984B2

United States Patent
Carson

(10) Patent No.: US 11,609,984 B2
(45) Date of Patent: Mar. 21, 2023

(54) SYSTEMS AND METHODS FOR DETERMINING A LIKELIHOOD OF AN EXISTENCE OF MALWARE ON AN EXECUTABLE

(71) Applicant: Digital Guardian LLC, Waltham, MA (US)

(72) Inventor: Dwayne A. Carson, Mendon, MA (US)

(73) Assignee: Digital Guardian LLC, Waltham, MA (US)

( * ) Notice: Subject to any disclaimer, the term of this patent is extended or adjusted under 35 U.S.C. 154(b) by 924 days.

(21) Appl. No.: 15/896,333

(22) Filed: Feb. 14, 2018

(65) Prior Publication Data

US 2019/0251251 A1 Aug. 15, 2019

(51) Int. Cl.
| | |
|---|---|
| G06F 21/52 | (2013.01) |
| G06F 21/51 | (2013.01) |
| H04L 9/40 | (2022.01) |
| G06N 20/00 | (2019.01) |
| G06F 21/56 | (2013.01) |

(52) U.S. Cl.
CPC .............. *G06F 21/51* (2013.01); *G06F 21/52* (2013.01); *G06F 21/56* (2013.01); *G06F 21/561* (2013.01); *G06F 21/566* (2013.01); *G06N 20/00* (2019.01); *H04L 63/1433* (2013.01); *H04L 63/1441* (2013.01); *G06F 21/568* (2013.01)

(58) Field of Classification Search
CPC ........... G06F 21/51–568; G06F 21/561; G06F 2221/033; G06N 20/00; G06N 20/10; G06N 3/0454; G06N 3/08–088; H04L 63/1441; H04L 63/1433; H04W 12/1208
See application file for complete search history.

(56) References Cited

U.S. PATENT DOCUMENTS 8,918,881 B2 * 12/2014 Bettini .................. H04W 12/37
  726/24
9,294,492 B1 * 3/2016 Martini ................. H04L 63/145
(Continued)

FOREIGN PATENT DOCUMENTS

| CA | 2902110 C | * | 7/2018 | ............. G06F 21/51 |
| CN | 105389193 A | * | 3/2016 | |

OTHER PUBLICATIONS

Shah, Shivani & Jani, Himali & Shetty, Sathvik & Bhowmick, Kiran. Virus Detection using Artificial Neural Networks. (2013). International Journal of Computer Applications. vol. 84. pp. 17-23.*

*Primary Examiner* — Jeffery L Williams
*Assistant Examiner* — Zhimei Zhu
(74) *Attorney, Agent, or Firm* — Fredrikson & Byron, P.A.

(57) ABSTRACT

Provided herein are systems and methods for determining a likelihood that an executable comprises malware. A learning engine may determine a plurality of attributes of an executable identified in a computing environment, and a corresponding weight to assign to each of the plurality of attributes. Each of the plurality of attributes may be indicative of a level of risk for the computing environment. The learning engine may generate, according to the determined plurality of attributes and the corresponding weights, one or more scores indicative of a likelihood that the executable comprises malware. A rule engine may perform an action to manage operation of the executable, according to the generated one or more scores.

18 Claims, 7 Drawing Sheets

(56) References Cited

U.S. PATENT DOCUMENTS

| | | | |
|---|---|---|---|
| 9,306,960 B1* | 4/2016 | Aziz | G06F 9/45537 |
| 9,390,268 B1* | 7/2016 | Martini | H04L 63/1441 |
| 9,881,157 B1* | 1/2018 | Lukacs | G06F 21/562 |
| 2007/0240217 A1* | 10/2007 | Tuvell | G06F 21/565 |
| | | | 726/24 |
| 2011/0302651 A1* | 12/2011 | Bates | G06F 9/44589 |
| | | | 726/22 |
| 2012/0311708 A1* | 12/2012 | Agarwal | G06F 21/566 |
| | | | 726/24 |
| 2016/0314298 A1* | 10/2016 | Martini | G06F 21/53 |
| 2016/0335435 A1* | 11/2016 | Schmidtler | G06F 21/562 |
| 2017/0004307 A1* | 1/2017 | Guo | G06F 21/562 |
| 2017/0078315 A1* | 3/2017 | Allen | H04L 63/1433 |
| 2017/0161498 A1* | 6/2017 | Yavo | G06F 21/566 |
| 2018/0129803 A1* | 5/2018 | Levin | G06F 21/52 |
| 2018/0203998 A1* | 7/2018 | Maisel | G06F 21/56 |
| 2018/0239903 A1* | 8/2018 | Bodin | G06F 21/577 |
| 2019/0034623 A1* | 1/2019 | Lowry | G06F 16/1734 |
| 2019/0318089 A1* | 10/2019 | Wang | G06N 20/20 |

* cited by examiner

SYSTEMS AND METHODS FOR DETERMINING A LIKELIHOOD OF AN EXISTENCE OF MALWARE ON AN EXECUTABLE

TECHNICAL FIELD

The present application relates generally to systems and methods for malware detection, including but not limited to systems and methods for determining a likelihood that an executable has malware.

BACKGROUND

In a computing environment, malware may be included or inserted into an executable as a process or subroutine. Once included or inserted, malware may for instance alter, destroy, or extract data from the computing environment in an unauthorized manner. Current detection techniques may rely on blacklists identifying which executables have malicious components. Such techniques, however, may be cumbersome and/or inadequate as blacklists may grow to be inordinately large and may not be comprehensive in detecting malware in executables.

SUMMARY

Described herein are systems and methods for determining a likelihood that an executable comprises malware. Executables may include one or more executable modules and each executable module may include one or more execution paths to be carried out in a computing environment. If an executable has malware (e.g., a virus, a warm, an adware, a backdoor, spyware, or Trojan), at least a subset of the execution paths of the executable may exhibit malicious behavior when executed. Examples of malicious behavior may include changing, deleting, extracting, or otherwise disrupting various executable modules of the computing environment, including executable modules belonging to other executables. Such execution paths may have been started by the executable code present at the time of installation or started from code inserted into the executable at a later point in time (e.g., as a plug-in or add-on).

Current approaches to detect malware may involve the use of a blacklist and a whitelist. The blacklist may identify which executables contain malware. The whitelist may also be used in conjunction with the blacklist, and may identify which executables are free of malware. As these lists enumerate each individual executable, the blacklist and whitelist may grow to be excessively long. Consequently, checking an executable against the blacklist and/or whitelist may consume a significant amount of computing resources and time. In addition, the blacklist and white list may not be comprehensive in enumerating all restricted and/or permitted executables. Generally, the blacklist and whitelist may contain a list of hash codes each representing the file content. Malware may be built using specific tools to mutate the file content, while maintaining the functionalities deleterious to the computing environment. Thus, such malware may go undetected even with the blacklist and the whitelist. Furthermore, such lists may be unable to identify individual executable modules or execution paths corresponding to malicious behavior. As a result, executables containing malware may run in the computing environment undetected.

To increase the accuracy or probability of detecting malware in executables in the computing environment, a malware detection system may include a learning engine to predict a likelihood that an executable contains malware and a rule engine to perform a countermeasure based on the prediction. The learning engine may train a prediction model for calculating the likelihood that an executable contains malware using training data (sometimes referred to as a validation dataset). The prediction model may include or incorporate an artificial neural network, a Bayesian network, a decision tree, a regression model, a k-nearest neighbor cluster model, and a support vector machine, among others. The training data may include a multitude of samples. The samples may include executables marked as containing malware or lacking malware. The executables may also be defined by a first set or combination of attributes corresponding to executables with malware and a second set or combination of attributes corresponding to benign executables.

Attributes indicative of the executable containing malware may be direct or indirect of the executable itself. For example, direct attributes corresponding to executables with malware may include a use of a non-standard compiler, embedded Uniform Resource Locators (URLs) or external Internet Protocol (IP) addresses, use of an unsafe application programming interface (API), use of a non-standard import string, existence of a packed or encrypted binary payload, having a file size smaller than a predetermined size, and lack of a signature or a root authority, among others. Indirect attributes corresponding to executables with malware may include downloading from an external site, exclusion from program files, and set as a hidden file, among others. Conversely, direct attributes corresponding to benign executables may include use of an enterprise compiler, a lack of embedded URLs or IP addresses, use of a safe or known API, use of a standard import string, lack of a packed or encrypted binary payload, a file size larger than the predetermined size, and existence of a legitimate signature, among others. Indirect attributes corresponding to benign executables may include installation via a signed installer package file, inclusion into program files, installation onto a standard location (e.g., program files) for a type of executable, or installation onto an expected location (e.g., program files) based on version information or certificate information, and being set as a visible file, among others.

Using the samples of the training data, the learning engine may train the prediction model. Inputs of the prediction model may include or correspond to the attributes of the training data. Outputs of the prediction model may include one or more scores or probabilities indicating the likelihood that the executable contains malware. One or more weights applied to the inputs of the prediction model may affect the outputs. Initially, the one or more weights (sometimes referred to as seed weights) may be assigned to random values. With the presentation of each sample in the training data, the learning model may calculate an error between the desired outcome and the determined outcome. Using the calculated error, the learning engine may adjust one or more weights of the prediction model to increase accuracy of the outputs. In the end, certain attributes may have a greater or lesser weight in the prediction model for the resultant outputs than other attributes.

After training with the training data, the learning engine may use the prediction model in run-time to determine the likelihood that an unmarked executable in a computing environment contains malware in the computing environment. To calculate the likelihood, the learning engine may determine one or more attributes of the executable. The learning engine may apply the one or more attributes of the executable as the inputs of the prediction model. In applying the prediction model to the attributes of the executable, the learning engine may identify a weight for each attribute to assign. Based on the weights and the corresponding values or scores of the attributes, the learning engine may calculate one or more scores indicating a likelihood that the executable contains malware.

Using the scores indicating the likelihood that the executable contains malware, the rule engine of the malware detection system may perform one or more countermeasures based on a policy. The policy may specify which countermeasures or actions to perform depending on the one or more scores calculated by the learning engine. The policy may for example specify automatically blocking an operation of the executable when the one or more scores indicate high likelihood that the executable contains malware. The policy may also specify displaying of a prompt to the end user of the computing environment when the one or more scores indicate low likelihood that the executable contains malware. The rule engine may compare the one or more calculated scores to the scores specified by the policy for each countermeasure or action. Based on the comparison, the rule engine may identify the countermeasure/action to perform, and may carry out the identified countermeasure/action.

By using training data to train a prediction model, the malware detection system of the present disclosure may increase accuracy or probability in detection of malware contained in executables. Furthermore, as the determination of the likelihood is independent of the identification of the executable, the malware detection system may check whether executables have injected malware. In addition, the countermeasures/actions carried out in response may be commensurate to the calculated likelihood of the executable.

At least one aspect of the present disclosure is directed to a system for determining a likelihood that an executable comprises malware. The system may include a learning engine executable on one or more processors. The learning engine may determine a plurality of attributes identified from an executable in a computing environment, and a corresponding weight to assign to each of the plurality of attributes. Each of the plurality of attributes can be indicative of a level of risk for the computing environment. The learning engine may generate, according to the determined plurality of attributes and the corresponding weights, one or more scores indicative of a likelihood that the executable comprises malware. The system may include a rule engine executable on the one or more processors. The rule engine may perform an action to manage operation of the executable, according to the generated one or more scores.

In some embodiments, the one or more scores may be indicative of at least one of: a likelihood of falsely identifying that the executable comprises malware, or a likelihood of falsely identifying that the executable is free of malware. In some embodiments, the plurality of attributes may include at least one of the executable: being associated with a non-standard compiler, using an embedded uniform resource locator (URL) or an external internet protocol (IP) address, using an unknown or unsafe application programming interface (API), using a non-standard import string, having packed or encrypted binary data, being smaller than a predetermined file-size, being unsigned, having no signature or root authority, being excluded from program files, being a hidden file, being downloaded from an external site, or having ability to encrypt files. In some embodiments, the plurality of attributes may include the executable being able to at least one of: start a process, start a process as a user, exit a process, open or access a process, suspend a process, open a process token, create a symbolic link, query a file system volume, access an environment string, create a thread or an execution path, exit a thread or an execution path, access a thread or an execution path, suspend a thread or an execution path, open a thread token or an execution path token, or create a named pipe, copy a file, print a file, or transmit a file out of the computing environment. In some cases, multiple processes can perform the same operation but create different levels of risk. For example, a first API may perform an operation to open a process (OpenProcess→RF-OPEN_PROCESSES) but a second API may perform an operation (ntOpenProcess→RF-OPEN_PROCESSES) to open a process in a more non-standard manner, resulting in a higher risk value than that of the first API.

In some embodiments, the learning engine may assign a weight to an attribute corresponding to the use of a first API, the assigned weight being lower than one for assigning to an attribute corresponding to the use of a second API that is riskier than the first API. In some embodiments, the system may include a second computing environment for use in unpacking or decrypting binary data of the executable for analysis. In some embodiments, the rule engine may evaluate the one or more scores against an assessment by a user. In some embodiments, the rule engine may adjust, responsive to the evaluation, at least one of: a weight to assign to one of the plurality of attributes, or a mathematical function of the learning engine.

In some embodiments, the rule engine may perform the action. The action may include automatically blocking an operation of the executable, adding or updating a rule in the learning engine to apply when the executable is detected, storing the one or more scores of the executable, sending the one or more scores to another learning engine or rule engine, sending a rule to block or control the operation of the executable to a rule engine for another computing environment, or sending one or more prompts to a user regarding the executable. In some embodiments, the plurality of attributes may include at least one of the executable: being associated with a standard compiler, not using an embedded uniform resource locator (URL) or an external internet protocol (IP) address, using a known or safe application programming interface (API), using a standard import string, not having packed or encrypted binary data, having a file-size of at least a predetermined value, being signed, having a legitimate signature, not being excluded from program files, being a visible file, or being installed using a known or signed installer file.

At least one aspect of the present disclosure is directed to a method of determining a likelihood that an executable comprises malware. A learning engine executing on one or more processors may determine a plurality of attributes of an executable identified in a computing environment, and a corresponding weight to assign to each of the plurality of attributes. Each of the plurality of attributes may be indicative of a level of risk for the computing environment. The learning engine may generate, according to the determined plurality of attributes and the corresponding weights, one or more scores indicative of a likelihood that the executable comprises malware. A rule engine executing on the one or more processors may perform an action to manage operation of the executable, according to the generated one or more scores.

In some embodiments, the one or more scores may be indicative of at least one of: a likelihood of falsely identifying that the executable comprises malware, or a likelihood of falsely identifying that the executable is free of malware. In some embodiments, the plurality of attributes may include at least one of the executable: being associated with a non-standard compiler, using an embedded uniform resource locator (URL) or an external internet protocol (IP) address, using an unknown or unsafe application programming interface (API), using a non-standard import string, having packed or encrypted binary data, being smaller than a predetermined file-size, having no signature or root authority, being excluded from program files, being a hidden file, being downloaded from an external site, or having ability to encrypt files. In some embodiments, the plurality of attributes may include the executable being able to at least one of: start a process, start a process as a user, exit a process, open or access a process, suspend a process, open a process token, create a symbolic link, query a file system volume, access an environment string, create an execution path, exit an execution path, access an execution path, suspend an execution path, open an execution path token, or create a named pipe, copy a file, print a file, or transmit a file out of the computing environment.

In some embodiments, the learning engine may assign a weight to an attribute corresponding to the use of a first API, the assigned weight being lower than one for assigning to an attribute corresponding to the use of a second API that is riskier than the first API. In some embodiments, the system may include a second computing environment for use in unpacking or decrypting binary data of the executable for analysis. In some embodiments, the rule engine may evaluate the one or more scores against an assessment by a user. In some embodiments, the rule engine may adjust, responsive to the evaluation, at least one of: a weight to assign to one of the plurality of attributes, or a mathematical function of the learning engine.

In some embodiments, performing the action may include automatically blocking an operation of the executable, or adding or updating a rule in the learning engine to apply when the executable is detected, storing the one or more scores of the executable, sending the one or more scores to another learning engine or rule engine, sending a rule to block or control the operation of the executable to a rule engine for another computing environment, or sending one or more prompts to a user regarding the executable. In some embodiments, the plurality of attributes may include at least one of the executable: being associated with a standard compiler, not using an embedded uniform resource locator (URL) or an external internet protocol (IP) address, using a known or safe application programming interface (API), using a standard import string, not having packed or encrypted binary data, having a file-size of at least a predetermined value, having a legitimate signature, not being excluded from program files, being a visible file, or being installed using a known or signed installer file.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

It should be understood that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the concepts disclosed herein will become more apparent from the detailed description set forth below when taken in conjunction with the drawings.

DETAILED DESCRIPTION

Following below are more detailed descriptions of various concepts related to, and embodiments of, inventive systems and methods for classifying content to prevent data breach or exfiltration. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes a network environment and computing environment which may be useful for practicing various computing related embodiments described herein.

Section B describes systems and methods for determining a likelihood that an executable comprises malware.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A. Computing and Network Environment

Prior to discussing specific embodiments of the present solution, it may be helpful to describe aspects of the operating environment as well as associated system components (e.g., hardware elements) in connection with the methods and systems described herein.

Figure 1A:
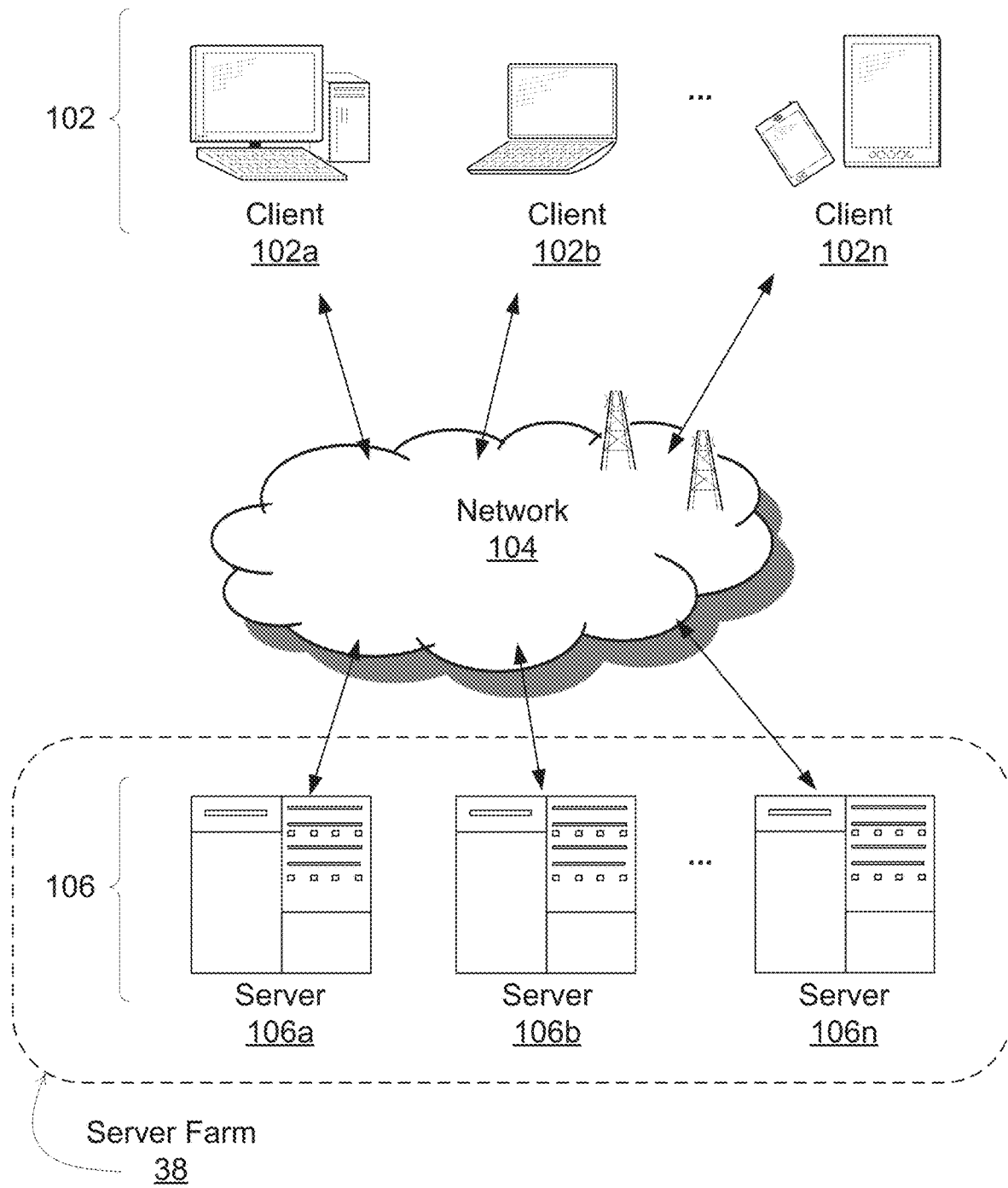
FIG. 1A is a block diagram depicting an embodiment of a network environment comprising client devices in communication with server devices.

Referring to FIG. 1A, an embodiment of a network environment is depicted. In brief overview, the illustrated exploring network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106. The clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network, which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the interne protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes may be in the path between any two communicating servers.

Figure 1B:
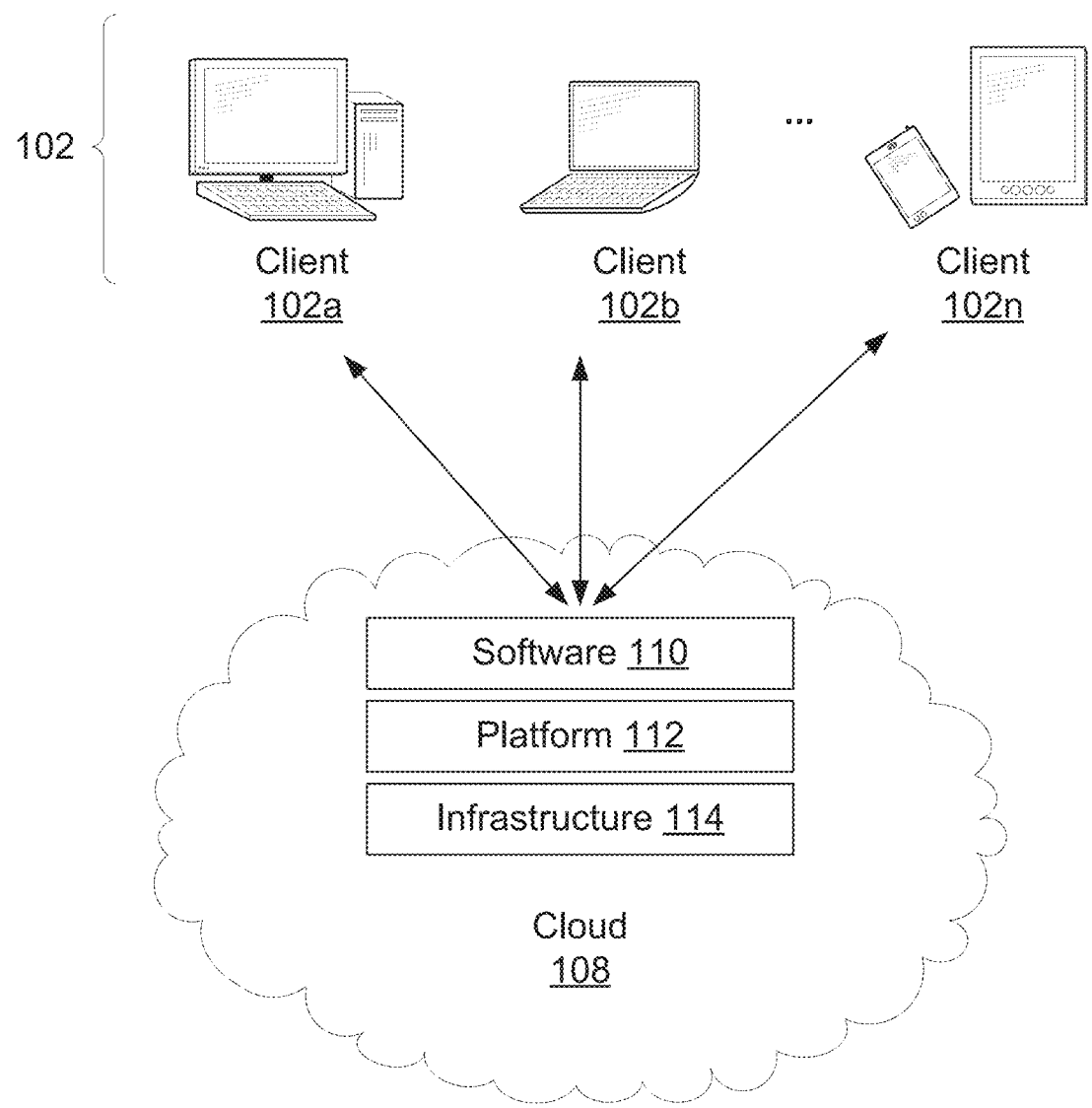
FIG. 1B is a block diagram depicting a cloud computing environment comprising client devices in communication with a cloud service provider.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
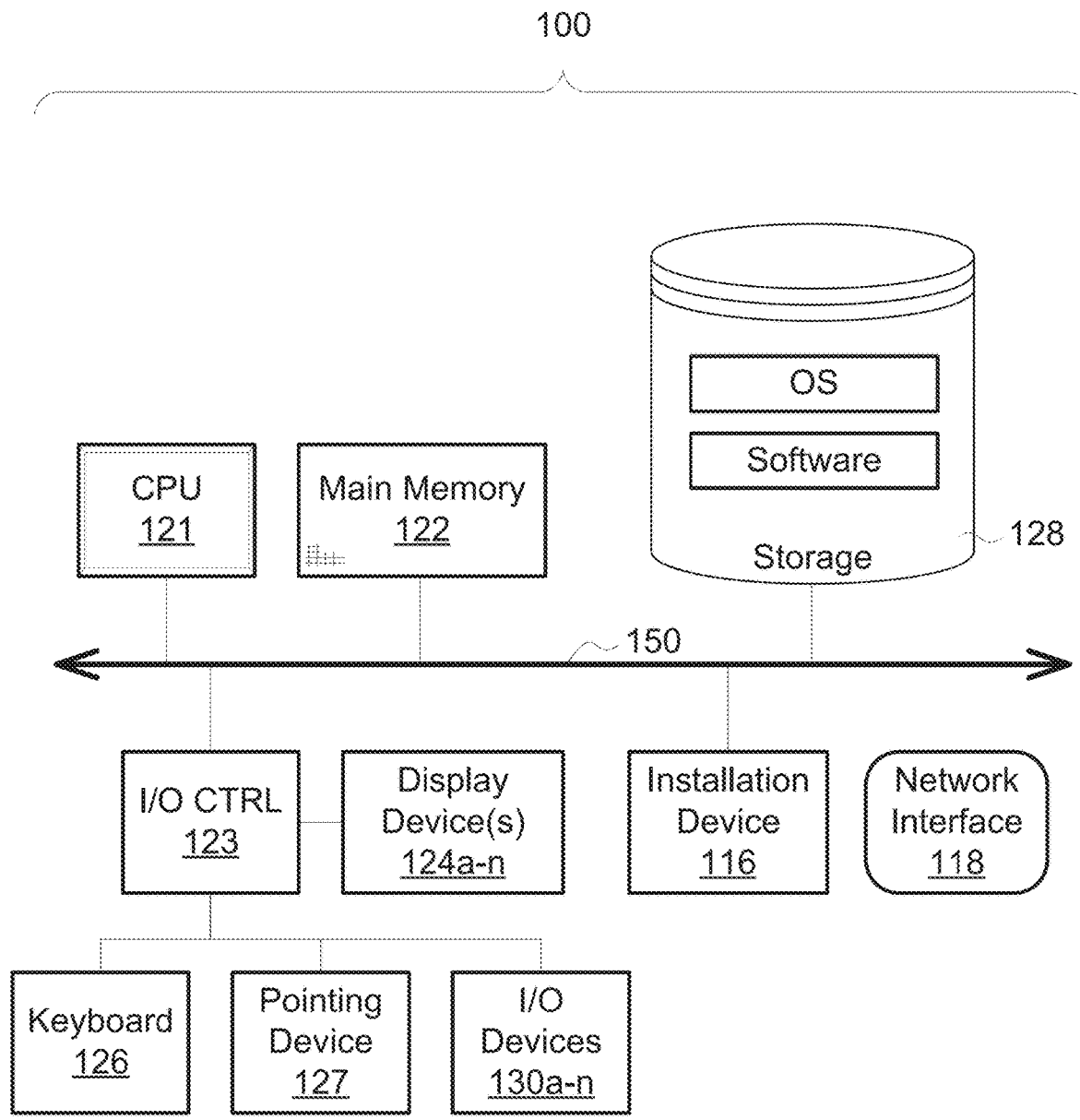
FIGS. 1C and 1D are block diagrams depicting embodiments of computing devices useful in connection with the methods and systems described herein.
Figure 1D:
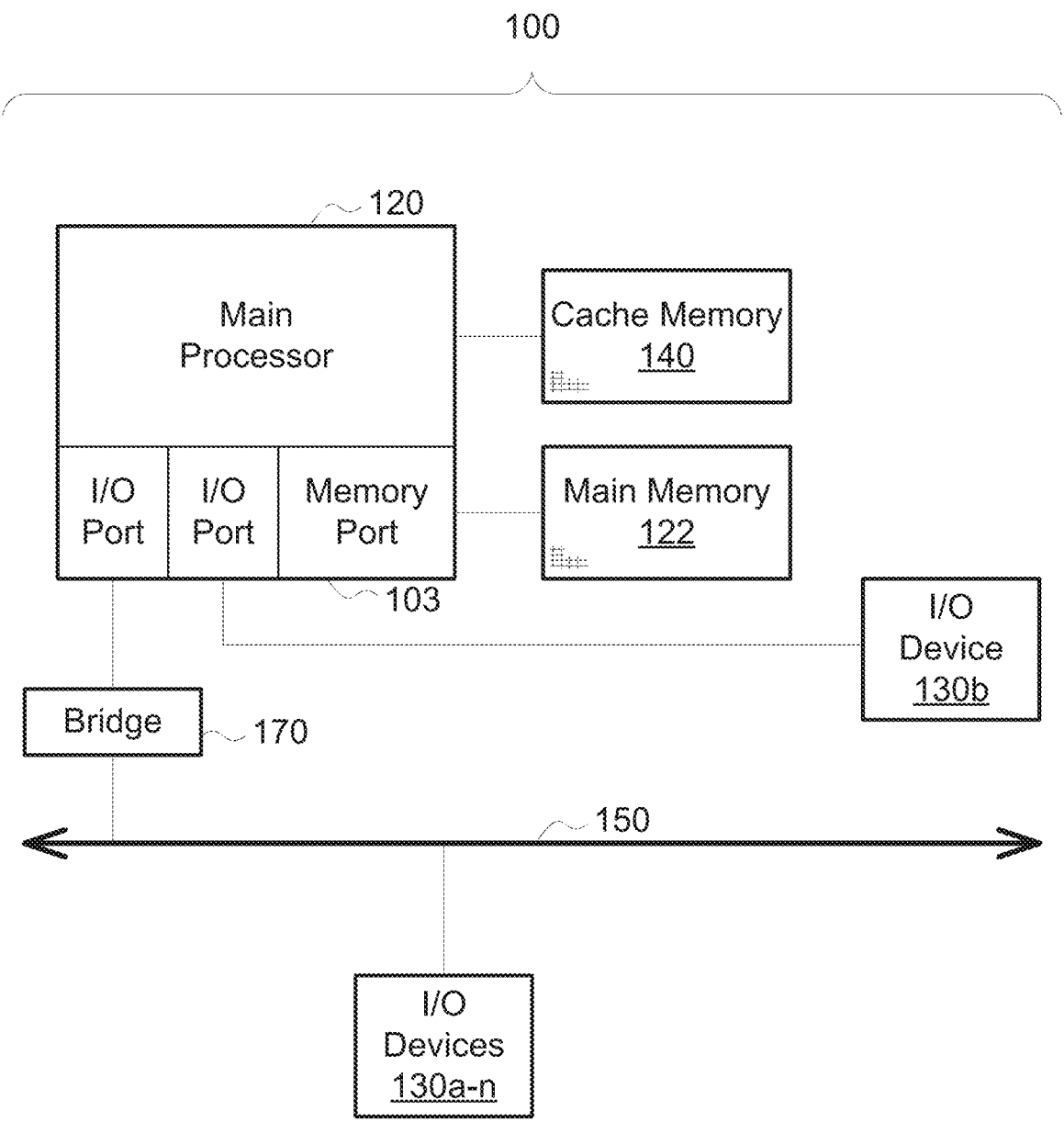

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, and/or software 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call. In some embodiments, the communication device 102 is a wearable mobile computing device including but not limited to Google Glass and Samsung Gear.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Determining a Likelihood that an Executable Comprises Malware Described herein are systems and methods for determining a likelihood that an executable comprises malware. Executables may include one or more executable modules and each executable module may include one or more execution paths to be carried out in a computing environment. If an executable has malware (e.g., a virus, a warm, an adware, a backdoor, spyware, or Trojan), at least a subset of the execution paths of the executable may exhibit malicious behavior when executed. Examples of malicious behavior may include changing, deleting, extracting, or otherwise disrupting various executable modules of the computing environment, including executable modules belonging to other executables. Such execution paths may have been started by the executable code present at the time of installation or started from code inserted into the executable at a later point in time (e.g., as a plug-in or add-on).

Current approaches to detect malware may involve the use of a blacklist and a whitelist. The blacklist may identify which executables contain malware. The whitelist may also be used in conjunction with the blacklist, and may identify which executables are free of malware. As these lists enumerate each individual executable, the blacklist and whitelist may grow to be excessively long. Consequently, checking an executable against the blacklist and/or whitelist may consume a significant amount of computing resources and time. In addition, the blacklist and white list may not be comprehensive in enumerating all restricted and/or permitted executables. The blacklist and/or whitelist may contain a list of hash codes each representing the file content. Malware may be built using specific tools to mutate the file content, while maintaining the functionalities deleterious to the computing environment. Thus, such malware may go undetected even with the blacklist and/or the whitelist. Furthermore, such lists may be unable to identify individual executable modules or execution paths corresponding to malicious behavior. As a result, executables containing malware may run in the computing environment undetected.

To increase the accuracy or probability of detecting malware in executables in the computing environment, a malware detection system may include a learning engine to predict a likelihood that an executable contains malware and a rule engine to perform a countermeasure based on the prediction. The learning engine may train a prediction model for calculating the likelihood that an executable contains malware using training data (sometimes referred to as a validation dataset). The prediction model may include or incorporate an artificial neural network, a Bayesian network, a decision tree, a regression model, a k-nearest neighbor cluster model, and a support vector machine, among others. The training data may include a multitude of samples. The samples may include executables marked as containing malware or lacking malware. The executables may also be defined by a first set or combination of attributes corresponding to executables with malware and a second set or combination of attributes corresponding to benign executables.

Attributes indicative of the executable containing malware may be direct or indirect of the executable itself. For example, direct attributes corresponding to executables with malware may include a use of a non-standard compiler, embedded Uniform Resource Locators (URLs) or external Internet Protocol (IP) addresses, use of an unsafe application programming interface (API), use of a non-standard import string, existence of a packed or encrypted binary payload, having a file size smaller than a predetermined size, and lack of a signature or a root authority, among others. Indirect attributes corresponding to executables with malware may include downloading from an external site, exclusion from program files, and set as a hidden file, among others. Conversely, direct attributes corresponding to benign executables may include use of an enterprise compiler, a lack of embedded URLs or IP addresses, use of a safe or known API, use of a standard import string, lack of a packed or encrypted binary payload, a file size larger than the predetermined size, and existence of a legitimate signature, among others. Indirect attributes corresponding to benign executables may include installation via a signed installer package file, inclusion to program files, installation onto a standard location (e.g., program files) for a type of executable, or installation onto an expected location (e.g., program files) based on version information or certificate information, and being set as a visible file, among others.

Using the samples of the training data, the learning engine may train the prediction model. Inputs of the prediction model may include or correspond to the attributes of the training data. Outputs of the prediction model may include one or more scores or probabilities indicating the likelihood that the executable contains malware. One or more weights applied to the inputs of the prediction model may affect the outputs. Initially, the one or more weights (sometimes referred to as seed weights) may be assigned to random values. With the presentation of each sample in the training data, the learning model may calculate an error between the desired outcome and the determined outcome. Using the calculated error, the learning engine may adjust one or more weights of the prediction model to increase accuracy of the outputs. In the end, certain attributes may have a greater or lesser weight in the prediction model for the resultant outputs than other attributes.

After training with the training data, the learning engine may use the prediction model in run-time to determine the likelihood that an unmarked executable in a computing environment contains malware in the computing environment. To calculate the likelihood, the learning engine may determine one or more attributes of the executable. The learning engine may apply the one or more attributes of the executable as the inputs of the prediction model. In applying the prediction model to the attributes of the executable, the learning engine may identify a weight for each attribute to assign. Based on the weights and the corresponding values or scores of the attributes, the learning engine may calculate one or more scores indicating a likelihood that the executable contains malware.

Using the scores indicating the likelihood that the executable contains malware, the rule engine of the malware detection system may perform one or more countermeasures based on a policy. The policy may specify which countermeasures or actions to perform depending on the one or more scores calculated by the learning engine. The policy may for example specify automatically blocking an operation of the executable when the one or more scores indicate high likelihood that the executable contains malware. The policy may also specify displaying of a prompt to the end user of the computing environment when the one or more scores indicate low likelihood that the executable contains malware. The rule engine may compare the one or more calculated scores to the scores specified by the policy for each countermeasure or action. Based on the comparison, the rule engine may identify the countermeasure/action to perform, and may carry out the identified countermeasure/ action.

By using training data to train a prediction model, the malware detection system of the present disclosure may increase accuracy or probability in detection of malware contained in executables. Furthermore, as the determination of the likelihood is independent of the identification of the executable, the malware detection system may check whether executables have injected malware. In addition, the countermeasures/actions carried out in response may be commensurate to the calculated likelihood of the executable.

Figure 2A:
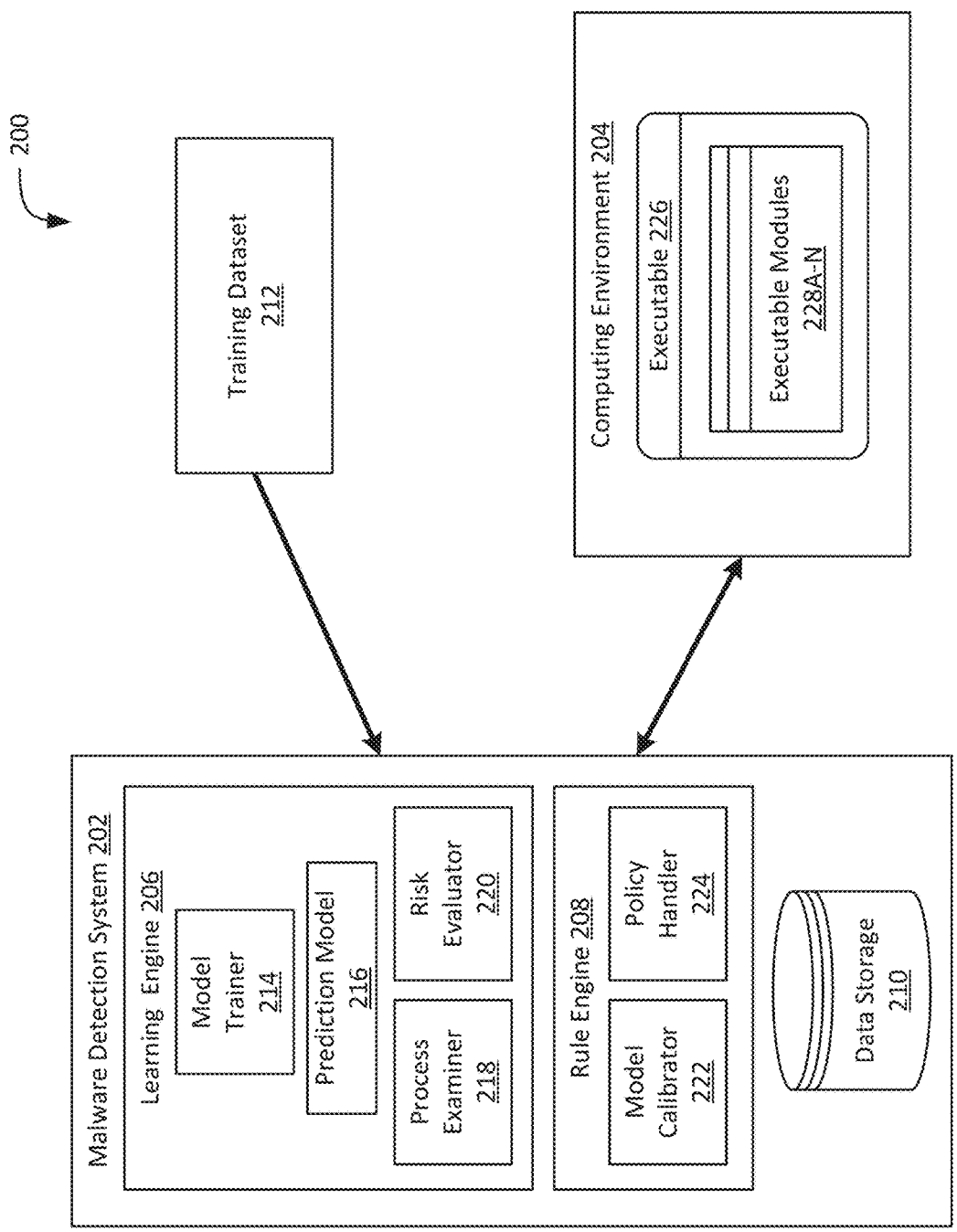
FIG. 2A is a block diagram depicting an example embodiment of a system for determining a likelihood that an executable comprises malware.

Referring now to FIG. 2A, an embodiment of a system 200 for determining a likelihood that an executable comprises malware is depicted. In brief overview, the system 200 may include a malware detection system 202 and a computing environment 204. The malware detection system 202 may include a learning engine 206, a rule engine 208, and a data storage 210. The malware detection system 202 may also receive a training dataset 212 and/or may interface with the computing environment. The learning engine 206 may include a model trainer 214, a prediction model 216, an attribute acquirer 216, and a risk evaluator 220. The policy engine 208 may include a model calibrator 222 and a policy handler 224. The computing environment 205 may correspond to the computing device 100 as described in FIGS. 1C and/or 1D for instance. In some embodiments, the computing environment 205 may correspond to a virtual machine instance running on the computing device 100. The computing environment 205 may include an executable 226. The executable 226 may be any form of software, script or program carried by the computing environment 205, and may include one or more executable modules 228 A-N (hereinafter generally referred to as executable module 228) which can includes execution paths.

Each of the above-mentioned elements or entities (e.g., the computing environment 210 and its components and the malware detection system 205 and its components) is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with FIGS. 1A-1D, in some embodiments, as detailed in section A.

To train the prediction model 218, the model trainer 214 of the learning engine 206 may receive, obtain, or retrieve the training dataset 212. The training dataset 212 may include one or more samples. Each sample may include or correspond to an executable (e.g., software, application, script, or computer program, etc.), a process of any executable, an execution path of the process for the executable, or a combination thereof, among others. The process may be a subset of the executable and the execution path in turn may be a subset of the process. Each sample of the training dataset 212 may be labeled or predetermined to as containing malware or as benign. A sample may be labeled as containing malware, when the corresponding executable, process, or execution path exhibits malicious behavior. Malicious behavior may include attempts to alter or delete data, to exfiltrate or move the data, or to disrupt another executable, process, or execution path in the computing environment without authorization or in an otherwise undesirable manner. A sample may be labeled as benign, when the corresponding executable, process, or execution path does not exhibit any malicious behavior. Each sample of the training dataset 212 may include one or more predetermined scores indicating a likelihood of whether the corresponding executable, process, or execution path contains malware. In some embodiments, the model trainer 214 may store the training dataset 212 onto the data storage 210.

In addition, each sample of the training dataset 212 may identify, specify, or otherwise include one or more attributes of the corresponding executable itself, for the process, and/or for the execution path. The training dataset 212 may have a first set of attributes indicative of an executable containing malware and other attributes may correlate to a benign executable. The attributes indicative that the executable contains malware may be direct or indirect of the executable itself. Direct attributes correlating with executables containing malware may include: a use of a non-standard compiler, embedded Uniform Resource Locators (URLs) or external Internet Protocol (IP) addresses, use of an unsafe application programming interfaces (APIs), use of a non-standard import string, existence of a packed or encrypted binary payload, having a file size smaller than a predetermined size, and lack of a signature or a root authority, among others. Indirect attributes correlating to executables containing malware may include downloading from an external site, exclusion from program files, and having/being set as a hidden file, among others. Indirect attributes corresponding to executables with malware may include downloading from an external site, exclusion from program files, and set as a hidden file, among others.

Conversely, the training dataset 212 may have a second set of attributes indicative of an executable not containing malware and being benign. The attributes indicative that the executable does not contain malware or is benign may be direct or indirect of the executable itself. Direct attributes correlating to benign executables may include: use of an enterprise compiler, a lack of embedded URLs or IP addresses, use of a safe or known API, use of a standard import string, lack of a packed or encrypted binary payload, having/being a file size larger than the predetermined size or within a certain range, and existence of a legitimate signature, among others. Indirect attributes correlating to benign executables may include installation via a known or a signed installer package file, inclusion to program files, and being set as a visible file, among others.

Additionally, the training dataset 212 may include a third set of attributes of an executable labeled as either malicious or benign. In general, the attributes of the third set by themselves may not correlate with an executable containing malware or being benign, but may be indicative of the executable containing malware or being benign in conjunction with the attributes from the first set or the second set. The attributes of the third set may include an ability of the corresponding executable to: start another process, start another process as a user, exit a process, open or access a process, suspend a process, open an access token of a process, create a symbolic link, query a file system volume, access an environment string, create an execution path, exit an execution path, access an execution path, suspend an execution path, open an access token of an execution path, create a named pipe, copy a file, print a file, or transmit a file out of the computing environment, among others.

Using the training dataset 212, the model trainer 214 may train, determine, or generate the prediction model 216 for determining a likelihood that an executable contains malware. The prediction model 216 may include or incorporate an artificial neural network, a Bayesian network, a Naïve Bayes classifier, a decision tree, a regression model, a k-nearest neighbor cluster model, and a support vector machine, among others. The prediction model 216 may include one or more inputs, one or more weights (or parameters), and one or more outputs. Each input to the prediction model 216 may correspond to an attribute or a combination of multiple attributes for each sample in the training dataset 212. Each output of the prediction model 216 may be a score measuring or indicating a likelihood (or probability) that an executable contains malware. The one or more weights of the prediction model 216 may relate, translate, or otherwise map the one or more inputs to a score at one of the outputs. In some embodiments, the inputs and the outputs of the prediction model 216 may be connected via feed-forward and/or feedback connections using the one or more weights. In some embodiments, the feed-forward connections from the inputs to the outputs of the prediction model 216 may have a predefined activation function (e.g., a hyperbolic tangent, a sigmoid function, a rectifier function, or a normalized exponential function, among others). In some embodiments, the feedback connection from the outputs to the inputs of the prediction model 216 may have a predefined backpropagation function. For example, the prediction model 216 may be or include an artificial neural network. In this example, a sigmoid function may be applied to the feedforward connection from the inputs to hidden nodes and a linear function may be applied from the hidden nodes to the outputs. Furthermore, a derivative of the sigmoid function can be used to adjust the internal weights of the model by passing to the derivative the error of the output of the model, based on a sample of training data, relative to the desired output for that training data, using gradient descent. Training may be complete when the error reaches some predefined lower bound. Passing this error back through the model, adjusted by the appropriate sigmoid derivative, at each internal layer may be referred to as back propagation. Internal weights may be continuously adjusted in this manner as each sample of training data is presented at the inputs.

By applying the samples of the training dataset 212 to the prediction model 216, the model trainer 214 may train the prediction model 216. In some embodiments, the model trainer 214 may apply the machine learning algorithm corresponding to the prediction model 216. For example, if the prediction model 216 is an artificial neural network, the model trainer 214 may carry out the corresponding algorithm to train the prediction model 216. The model trainer 214 may set the one or more weights of the prediction model 216 to an initial value. The initial value may be at random, predetermined, or identically distributed, among others. Each time a sample of the training dataset 212 is applied, the model trainer 214 may calculate one or more scores from the prediction model 216. The model trainer 214 may identify the predetermined scores for the sample(s) of the training dataset 216.

The model trainer 214 may compare the predetermined scores with the calculated scores to determine a deviation between the two scores. The model trainer 214 may also determine whether the deviation between the predetermined scores and the calculated scores is greater than a threshold. If the deviation is greater than the threshold, the model trainer 214 may determine that the prediction model 216 has not yet completed training. Based on the deviation, the model trainer 214 may adjust the one or more weights of the prediction model 216. On the other hand, if the deviation is less than the threshold, the model trainer 214 may increment a number of times that the deviation is less than the threshold. Once the number of times that the deviation is less than the threshold has reached a predetermined number, the model trainer 214 may determine that the prediction model 216 has reached convergence. The model trainer 214 may further determine that the prediction model 216 has completed training. The model trainer 214 may also store the prediction model 216 onto the data storage 210. In some embodiments, the model trainer 214 may further store the weights for each attribute onto the data storage 210.

Once the training of the prediction model 216 is complete, the process examiner 218 may acquire, identify, or determine one or more attributes of an executable 226 in a computing environment 204. In some embodiments, the process examiner 218 may determine the one or more attributes of the executable 226 stored on a disk in the computing environment 204. In some embodiments, the process examiner 218 may determine the one or more attributes of the executable 226 upon detecting initiation of the executable 226 in the computing environment 204. For instance, the process examiner 218 may detect a process of the executable 226 in the computing environment 204, and may identify an executable module corresponding to the process to examine. The process may correspond to additional code loaded onto the executable 226 subsequent to initialization of the executable 226. The loading of additional code may be through the executable modules 228 (e.g., dynamic link libraries). The executable 226 may have one or more executable modules 228A-N (hereinafter generally referred to as executable module(s) 228) corresponding to various functions or routines for carrying out the executable 226. Each executable process 228 in turn may include one or more execution paths. In some embodiments, the process examiner 218 may acquire, identify, or determine one or more attributes of the one or more executable modules 228 forming the executable 226 and/or the one or more execution path forming the respective executable module 228. The process examiner 218 may examine the executable module stored on disk, or when an instance of the executable module is loaded in memory for execution (e.g., examine the instance of the executable module in memory). In some embodiments, the process examiner 218 may load an instance of the executable 226 onto memory and identify a mapping of memory addresses for the executable 226. In some embodiments, the process examiner 218 may access the computing environment 224 to identify the executable 226. The executable 226 may correspond to one or more files stored on a memory of the computing environment 204. The one or more files may include an executable file (e.g., ".exe", ".pe", or ".mz," etc.), a batch file (e.g., ".bat" or ".cmd", etc.), or a dynamic link library (e.g., "dll," ".ocx", etc.), among others. Once the executable 226 is identified, the process examiner 218 may parse the executable 226 to acquire or determine the one or more attributes of the executable 226, the one or more executable modules 228 of the executable 226, and/or the one or more execution paths of the respective executable module 228. In some embodiments, the process examiner 218 may also parse one or more executable binaries or libraries (e.g., dynamic link files) during execution of the executable 226.

While running in the computing environment 204 (e.g., when the executable 226 is loaded in memory), the executable 226 may load or pull in one or more binary or dynamic libraries from the disk while loading. The one or more binary or dynamic libraries to be loaded may have been analyzed by the process examiner 218, and the result of the analyses of the libraries may be stored on the data storage 210. The analyses of the dynamic library upon loading may be time-consuming, and as such storing the result of the analyses may lower time spent in future analyses of the executable 226. If the executable 226 is run in the computing environment 204 for the first time, however, the process examiner 218 may run an analysis of the executable 226 in the manner detailed below. In this manner, analyses of subsequent instances of the executable 226 within the computing environment 204 may leverage from the results of the analyses of the very first instance of the executable 206. For added security, the process examiner 218 may keep track of binary or dynamic libraries running on all instances of the executable 226 in the computing environment 204, in consideration of the fact that a library not previously analyzed may be loaded by one of the instances of the executable 226. Each instance of the executable 226 may load different binary or dynamic libraries over time based on other conditions in the computing environment 204.

The one or more attributes of the executable 226, the one or more executable modules 228 of the executable, and/or the one or more execution paths of the respective executable module 228 may include the one or more attributes of the executables for the samples as in the training dataset 212. The one or more attributes or a combination of the one or more attributes may be indicative of whether the executable 226 contains malware. The one or more attributes may also be indicative of a level of risk of the executable 226 to the computing environment 204. As discussed above, the attributes indicative that the executable contains malware may be direct or indirect of the executable itself. Direct attributes correlating with executables containing malware may include: a use of a non-standard compiler, embedded Uniform Resource Locators (URLs) or external Internet Protocol (IP) addresses, use of an unsafe application programming interfaces (APIs), use of a non-standard import string, existence of a packed or encrypted binary payload, having a file size smaller than a predetermined size, and lack of a signature or a root authority, among others. Indirect attributes correlating to executable 226 as containing malware may include downloading from an external site, exclusion from program files, and set as a hidden file, among others. Indirect attributes corresponding to executables with malware may include downloading from an external site, exclusion from program files, and being set as a hidden file, among others.

Conversely, the attributes indicating that the executable 226 does not contain malware is benign may be direct or indirect of the executable 226 itself. Direct attributes correlating to benign executables may include: use of an enterprise compiler, a lack of embedded URLs or IP addresses, use of a safe or known/standard API, use of a standard import string, lack of a packed or encrypted binary payload, having a file size larger than the predetermined size, and existence of a legitimate signature, among others. Indirect attributes indicating that the executable 226 does not contain malware may include installation via a known or a signed installer package file, inclusion to program files, and set as a visible file, among others. Other attributes by themselves may not correlate with (or be indicative of) the executable 226 as containing malware or being benign, and can be considered with other attribute(s) to determine a probability of the executable 226 containing malware or being benign. Such attributes of the executable 226 may include an ability of the executable 226, the one or more executable modules 228 of the executable, and/or the one or more execution paths of the respective executable module 228 to: start another process, start another process as a user, exit a process, open or access a process, suspend a process, open an access token of an executable module, create a symbolic link, query a file system volume, access an environment string, create an execution path, exit an execution path, access an execution path, suspend an execution path, open an access token of an execution path, create a named pipe, copy a file, print a file, or transmit a file out of the computing environment, among others. While the executable 226 is running or in an active state, the attributes of the executable module 228 may also include creating another thread, exiting the thread, accessing another thread, suspending any thread, opening an access token of a thread, and creating a named pipe, among others. Threads may relate to running of the executable 226 with multiple threads of execution. For example, hundreds of threads may be run in the executable 226 running in the computing environment 204 for the same section of computer-executable code. In contrast, executable paths may include or corresponding to different sections of the computer-executable code itself on which different threads may be running. Furthermore, executable paths may exist in executables 226 that are non-running or inactive in the computing environment 204. The process examiner 218 may analyze the executable 226 in either active or inactive state for the one or more attributes.

To determine attributes of the executable 226, the process examiner 218 may use a test computing environment (e.g., a sandbox environment) separate from the computing environment 204 to acquire or determine the one or more attributes of the executable 226. The test computing environment may be part of system 200, and may be used to unpack or decrypt binary data of the executable 226 for analysis. In some embodiments, the process examiner 218 may instantiate or create the test computing environment. In some embodiments, the process examiner 218 may identify another computing environment separate from the computing environment 204 to use as the test computing environment. In the test computing environment, the process examiner 218 may unpack or decrypt the binary data corresponding to the executable 226 for analysis. Once unpacked or decrypted, the process examiner 218 may determine the one or more attributes of the executable 226, the one or more executable modules 228 of the executable 226, or the one or more execution paths of each executable module 228. In some embodiments, the process examiner 218 may determine whether the executable 226 has a signature or root authority from the decrypted or unpacked binary data. In some embodiments, the process examiner 218 may decompile the binary data corresponding to the executable 226 to recover assembly code. Using the recovered assembly code, the process examiner 218 may determine or identify various attributes, such as embedded URLs or external IP addresses, a type of API, function calls (e.g., copying a file, printing a file, or transmitting a file out of the computing environment), and import string, among others. In some embodiments, the determination of the one or more attributes of the executable 226 using the unpacked or decrypted binary data may be performed in the same computing environment 204.

In determining certain attributes of the executable 226, the process examiner 218 may traverse, map or trace the one or more executable modules 228 of the executable 226. For each executable module 228, the process examiner 218 may inspect or analyze the executable module 228. In some embodiments, the process examiner 218 may inspect or analyze the binary data corresponding to the executable module 228. The binary data may already have been unpacked or decrypted. The process examiner 218 may determine the one or more abilities of the executable module 228, such as starting another process, exiting a process, opening or accessing a process, suspending a process, opening an access token of a process, creating a symbolic link, querying a file system volume, and accessing an environment string, among others. From inspecting the executable module 228, the process examiner 218 may also determine other functionalities of the executable module 228 with one or more input/output devices connected to the computing environment 204, such as copying a file, printing a file, or transmitting a file out of the computing environment, among others.

For each executable module 228, the process examiner 218 may traverse, map or trace the one or more execution paths forming the executable module 228. At each execution path of the executable module 228, the process examiner 218 may inspect or analyze the execution path. In some embodiments, the process examiner 218 may inspect or analyze the binary data corresponding to the execution path. The binary data may already have been unpacked or decrypted. By inspect or analyzing the execution path, the process examiner 218 may determine the one or more abilities of the execution path of the executable module 228, such as creating another execution path, exiting the execution path, accessing another execution path, suspending any execution path, opening an access token of an execution path, and creating a named pipe, among others. The one or more attributes of the executable 226 may include the abilities of each execution path and/or the respective executable module 228 forming the executable 226.

For certain attributes of the executable 226, the process examiner 218 may determine or identify the one or more attributes of the executable 226 without unpacking or decrypting the binary data. In some embodiments, the process examiner 218 may parse metadata associated with the executable 226. The metadata may be a part of the file corresponding to the executable 226 or another file associated with the executable 226 (e.g., in the same directory as the file corresponding to the executable 226). From the metadata associated with the executable, the process examiner 218 may determine one or more attributes directly or indirectly related to the executable 226, such as a file size of the file, visibility of the file, and origin of the file corresponding to the executable 226 (e.g., downloaded from external site or installed using an installer package file).

Once the one or more attributes of the executable 226 is determined, the process examiner 218 may store the one or more attributes with an identifier for the executable 226 onto the data storage 210. In some embodiments, the identifier may be for one of the executable modules 228 of the executable 226 associated with the one or more attributes. In some embodiments, the identifier may be for one of the execution paths of the respective executable module 228. The process examiner 218 may determine or generate the identifier for the executable 226 based on the executable 226 itself. In some embodiments, the process examiner 218 may calculate a hash value by applying the binary data corresponding to the executable 226 to a hash function to generate the identifier for the executable 226. In some embodiments, the process examiner 218 may use the signature or root authority of the executable 226 as the identified for the executable 226. Once the identifier for the executable 226 is determined, the process examiner 218 may store the identifier and the corresponding one or more attributes. In this manner, instead of performing analyzing the executable 226 every time, the process examiner 218 may determine the identifier for the executable 226 (e.g., by calculating the hash value of the binary data for the executable 226). Using the identifier for the executable 226, the process examiner 218 may then access the data storage 210 to determine or identify the one or more attributes of the executable 226.

With the determination of one or more attributes of the executable 226, the risk evaluator 220 may calculate or determine a weight to assign to each attribute of the executable 226, the corresponding executable module 228, or the respective execution path. Each weight may be a numerical measure and may indicate a contributive factor to the overall level of risk that the executable 226 poses to the computing environment 204. Certain attributes or particular combination of attributes may be more indicative of higher levels of risk than other attributes, and the higher levels of risk may be reflected in the corresponding weights. Individual attributes may be valuable as a reference in understanding why the prediction model 216 decided whether the executable 226 contains malware. For example, an API deemed to be less risky than another API may be assigned by the risk evaluator 220 to have a weight lower than the weight corresponding to the more risky API. In some embodiments, the risk evaluator 220 may determine the corresponding weights from the prediction model 216 trained using the training dataset 212. The risk evaluator 220 may apply the one or more attributes determined for the executable 226 as inputs to the prediction model 216. With the application of the one or more attributes as the inputs of the prediction model 216, the risk evaluator 220 may calculate the weight for each attribute. In some embodiments, the risk evaluator 220 may determine the weight of each attribute from the training dataset 212. In some embodiments, the risk evaluator 220 may access the data storage 210 to identify the weight for the respective attribute.

Based on the determined attributes of the executable 226 and the weights corresponding to the attributes, the risk evaluator 220 may calculate, estimate, predict, determine, or generate one or more scores indicative of a likelihood that the executable 226 contains malware. The one or more scores may be a numerical value or measure indicating an overall risk that the executable 226 poses to the computing environment 204. The one or more scores may also indicative of a likelihood of falsely identifying the executable 226 as containing malware (sometimes referred to as a false-positive measure for identifying the executable 226 as malware). The one or more scores may also be indicative of a likelihood of falsely identifying the executable 226 as free of malware (also referred to as a false-positive measure for identifying the executable 226 as benign). In some embodiments, by applying the one or more attributes of the executable 226 as the inputs of the prediction model 216, the risk evaluator 220 may generate the one or more scores as the corresponding outputs of the prediction model 216. In some embodiments, the risk evaluator 220 may generate a single aggregate score based on a combination of the one or more scores corresponding to the outputs of the prediction model 216 (e.g., a weighted combination or weighted sum, or weighted average). In some embodiments, the risk evaluator 220 may insert or include the one or more scores into the application initialization event of the executable 226. In this manner, upon execution of the executable 226, the computing environment 204 may retrieve the one or more scores for the rule engine 208 to process.

In some embodiments, the risk evaluator 220 may store the one or more scores and the one or more attributes with the identifier for the executable 226 onto the data storage 210. In some embodiments, the identifier may be for one of the executable modules 228 of the executable 226 associated with the one or more attributes. In some embodiments, the identifier may be for one of the execution paths of the respective executable module 228. The risk evaluator 220 may determine or generate the identifier for the executable 226 based on the executable 226 itself. In some embodiments, the risk evaluator 220 may calculate a hash value by applying the binary data corresponding to the executable 226 to a hash function to generate the identifier for the executable 226. In some embodiments, the risk evaluator 220 may use the signature or root authority of the executable 226 as the identifier for the executable 226. Once the identifier for the executable 226 is determined, the risk evaluator 220 may store the identifier, the corresponding one or more attributes, and/or the one or more scores for the executable 226. In this manner, instead of analyzing the executable 226 every time and calculating the one or more scores for the executable 226, the risk evaluator 220 may determine the identifier for the executable 226 (e.g., by calculating the hash value of the binary data for the executable 226). Using the identifier for the executable 226, the risk evaluator 220 may then access the data storage 210 to determine the one or more scores for the executable 226. In some embodiments, the risk evaluator 220 may send or provide the identifier for the executable 226, the one or more attributes, and/or the one or more scores to another instance of the malware detection system 202. By doing so, each instance of the malware detection system 202 may determine the one or more scores for the executable 226, without analyzing the executable 226 each time any instance of the malware detection system 202 detects the executable 226.

In some embodiments, the risk evaluator 220 may generate an output for an administrator or an end user of the computing environment 204. The output may also include the one or more weights used to calculate the one or more scores. The output for the one or more scores may be outputted, for example, in the following format:

```
*****START*****
EχE NAME:
Malware_0ab7965fd68b84b94138b4249676d476701f7aa6851424c539d7431a
RISKS:
===========================================================
Capable of Creating Symbolic Links, score=8.000000000
Capable of Querying File System Volumes, score=9.000000000
Capable of Opening Process Tokens, score=6.000000000
```

```
Capable of Accessing Environment Strings, score=3.000000000
Capable of Accessing already Running Processes, score=8.000000000
Capable of Starting Processes, score=10.000000000
Capable of Creating Named Pipes, score=5.000000000
Executable files is not under Program Files, score=1.000000000
Executable is not signed, score=5.000000000
Executable is not signed by Microsoft, score=5.000000000
Executable contains embedded URLS, score=5.000000000
Executable contains embedded IPs, score=5.000000000
============================================================
Test Output[0]: out[0]=25.009136 out[1]=4.892147
Determination is: Malware
```

In some embodiments, once the one or more scores are generated, the model calibrator 222 may adjust the one or more scores, the weights for the corresponding attributes, and/or the prediction model 216 based on an evaluation. In some embodiments, the model calibrator 222 may calculate one or more scores and weights for the corresponding attributes anew, separate of the prediction model 216 based on the evaluation. In some embodiments, the model calibrator 224 may evaluate the one or more scores against an assessment. The assessment may be received by the model calibrator 222 subsequent to the generation of the one or more scores for the executable 226. In some embodiments, the assessment may be by a user, an operator of the learning engine, or an administrator of the malware detection system 202 or the computing environment 204. For example, the administrator of the malware detection system 202 may analyze the output generated by the risk evaluator 220 via a graphical user interface., and may adjust the one or more weights or the one or more scores from the output. In some embodiments, the model calibrator 222 may send a request for an assessment to a remote server. The remote server may maintain one or more weights and/or one or more scores for executables aggregated from other instances of the malware detection system 202. The aggregated one or more weights and/or one or more scores may be part of an assessment. The remote server in turn may send the assessment including the one or more weights and/or one or more scores aggregated from other instances to the model calibrator 222.

The assessment may include one or more labeled scores different from the corresponding score generated using the prediction model 216 for the executable 226. Using the assessment, the model calibrator 222 may set each score generated from the prediction model 216 to the corresponding labeled score from the assessment. The assessment may also include one or more labeled weights different from the corresponding weight for the attribute of the executable 226. In some embodiments, the model calibrator 222 may set each weight for the corresponding attribute of the executable to the corresponding weight from the assessment. In some embodiments, the model calibrator 222 may use the one or more labeled weights and/or the one or more labeled scores of the assessment to adjust the prediction model 216 of the learning engine 206. For example, the model calibrator 222 may use a weighted combination of the one or more labeled weights of the assessment and the one or more weights determined by the model trainer 214 to adjust the prediction model 216.

Based on the one or more scores indicating the likelihood that the executable 226 contains malware, the policy handler 224 may perform a set of actions (sometimes referred to as countermeasures) to manage operation of the executable 226 according to the one or more generated scores. In some embodiments, the set of actions may be to manage the executable modules 228 of the executable 226, the execution paths of the executable module 228, and/or the computing environment 204. In some embodiments, the policy handler 224 may perform the set of actions in response to detecting that the executable 226 is initiating execution and/or installation of a component. In some embodiments, the policy handler 224 may insert or include the set of actions to perform into the application initialization event of the executable 226. In this manner, upon execution of the executable 226, the computing environment 204 may apply the set of actions inserted by the policy handler 224.

In some embodiments, the policy handler 224 may identify a policy stored in the data storage 210. The policy may specify which action to perform based on the one or more generated scores. In some embodiments, the policy may specify which action to perform based on a predetermined set of ranges for the one or more generated scores. For example, for a one particular set of values of the one or more generated scores, the policy may specify terminating the execution of the executable 226. For another particular set of values for the one or more generated scores, the policy may specify interruption of one of the executable modules 228 of the executable 226.

Different sets of actions may be performed by the policy engine 224 based on the likelihood that the executable contains malware 226. When the one or more scores indicate that there is a high likelihood (e.g., greater than 66% or other level) that the executable 226 contains malware, the set of actions performed by the policy handler 224 may include: interrupting or blocking an operation of the executable 226, the one or more executable modules 228 of the executable 226, and/or the one or more execution paths in each executable module 228; storing a rule onto the data storage 210 to interrupt or block the operation of the executable 226, the one or more executable modules 228, and/or the one or more execution paths; and sending the rule to block or control the operation of the executable 226, the one or more executable modules 228 of the executable 226, and/or the one or more execution paths in each executable module 228 to another instance of the rule engine 208, among others. When the one or more scores indicate that there is a moderate likelihood (e.g., between 33% and 66%, or other range) that the executable 226 contains malware, the set of actions performed by the policy handler 224 may include: storing the one or more scores generated for the executable 226 for future analysis onto the data storage 210; sending the one or more scores to another instance of the learning engine 206 of another instance of the malware detection unit 202; and sending one or more prompts for display to the end user of the computing environment 204 regarding the risk of the executable 226. When the one or more scores indicate that there is a low likelihood (e.g., less than 33%) that the executable 226 contains malware, the set of actions performed by the policy handler 224 may include: permitting the executable 226, the one or more executable modules 228 of the executable 226, or the one or more execution paths of the executable module 228 to operate in the computing environment 204; and sending one or more prompts for display to the end user of the computing environment 204 regarding the risk of the executable 226, among others.

In some embodiments, the policy engine 224 may store the set of actions, the one or more scores, and/or the one or more attributes with the identifier for the executable 226 onto the data storage 210. In some embodiments, the identifier may be for one of the executable modules 228 of the executable 226 associated with the one or more attributes. In some embodiments, the identifier may be for one of the execution paths of the respective executable module 228. The policy engine 224 may determine or generate the identifier for the executable 226 based on the executable 226 itself. In some embodiments, the policy engine 224 may calculate a hash value by applying the binary data corresponding to the executable 226 to a hash function to generate the identifier for the executable 226. In some embodiments, the policy engine 224 may use the signature or root authority of the executable 226 as the identified for the executable 226. Once the identifier for the executable 226 is determined, the policy engine 224 may store the identifier, together with the set of actions, the corresponding one or more attributes, and the one or more scores for the executable 226. In this manner, instead of analyzing the executable 226 every time and calculating the one or more scores for the executable 226, the policy engine 224 may determine the identifier for the executable 226 (e.g., by calculating the hash value of the binary data for the executable 226). Using the identifier for the executable 226, the policy engine 224 may then access the data storage 210 to determine which set of actions to perform to operate the executable 226. In some embodiments, the policy engine 224 may send or provide the identifier for the executable 226, the one or more attributes, and the one or more scores to another instance of the malware detection system 202. By doing so, each instance of the malware detection system 202 may determine which set of actions to perform without analyzing the executable 226 each time any instance of the malware detection system 202 detects the executable 226.

Figure 2B:
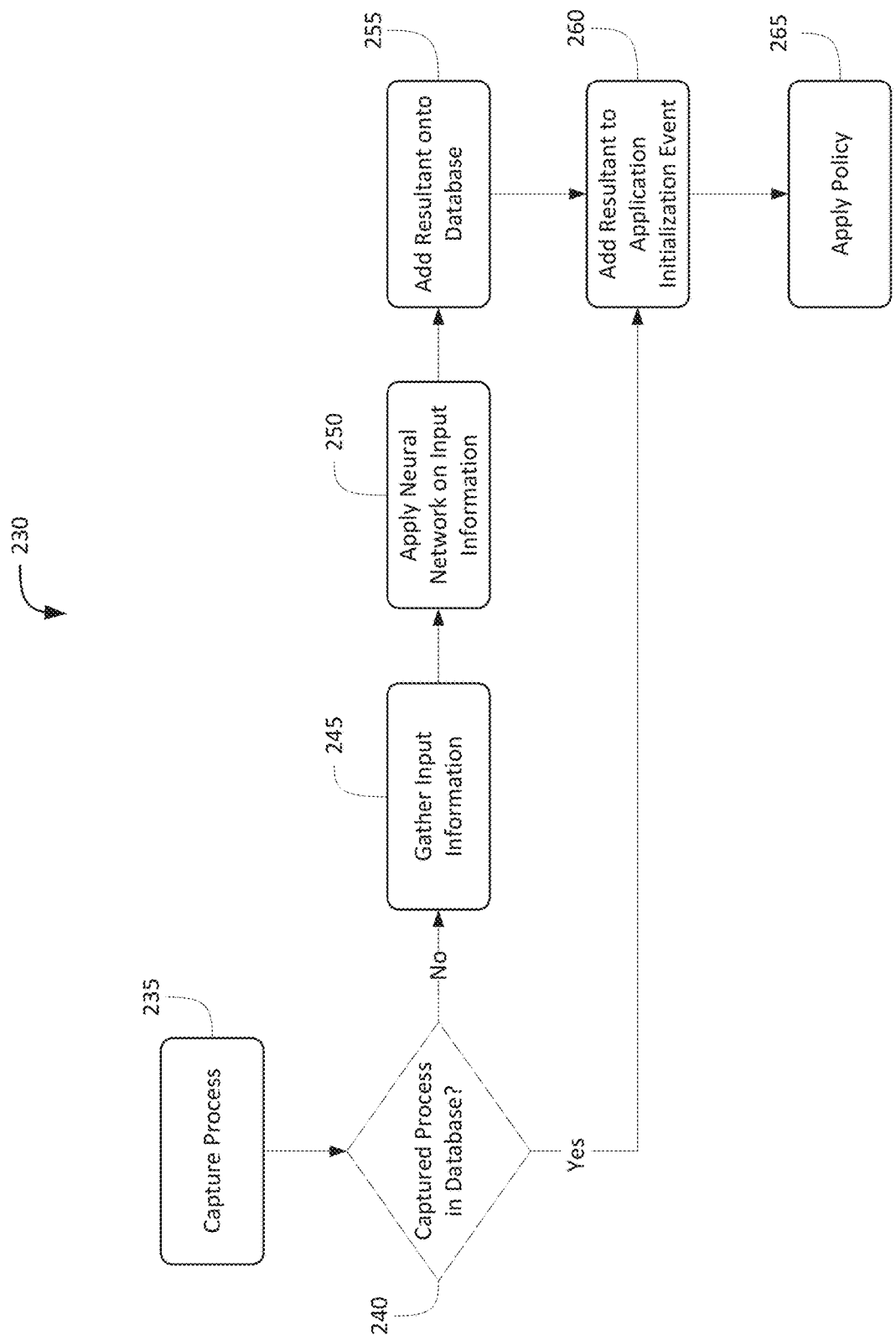
FIG. 2B is a flow diagram depicting an example embodiment of a method of determining a likelihood that an executable comprises malware.

Referring now to FIG. 2B, an embodiment of a method 230 for determining a likelihood that an executable comprises malware is depicted. The method 230 may be performed or be executed by any one or more components of system 100 as described in conjunction with FIGS. 1A-1D or system 200 as described in conjunction with FIG. 2A. In brief overview, a learning engine may capture a process (235). The learning engine may determine whether information about the captured process is stored in a database (240). If an identification/record of the captured process is not stored in the database, the learning engine may gather input information from the captured process (245). The learning engine may apply a neural network onto the input information (250). The learning engine may add a resultant or output of the neural network onto the database (255). In any event, the learning engine may add the resultant or output to an application initialization event (260). A rule engine may apply a policy in accordance to the application initialization event (265).

In further detail, a learning engine may capture or detect a process (235). The learning engine may identify an executable from a computing environment. The process may include or correspond to a set of executable modules stored in a database. Each executable module of the executable may also include a set of execution paths stored in the database. The learning engine may traverse a set of executable modules forming an executable.

The learning engine may determine whether the captured process corresponding to an executable module is stored in a database (240). The database may include a list of executable modules for the executable. In the list of executable modules, each executable module may be indexed by an identifier corresponding to the executable module. The identifier may be a hash value of binary data corresponding to the executable module. For each executable module, the list of the database may include one or more attributes of the executable module. The learning engine may access the list of executable modules of the database to search for the captured/detected executable module to determine whether information about the executable module is stored in the database. If the captured executable module is not stored in the database, the learning engine may retrieve the identifier for the captured executable module, the one or more attributes, and/or the one or more scores indicating a likelihood that the captured executable module corresponds to malware.

In contrast, if information about (e.g., a record or an identification of) the corresponding executable module is not stored in the database, the learning engine may gather input information from the executable module (245). The learning engine may identify one or more attributes of the executable module by analyzing the executable module. The one or more attributes of the executable module may indicate whether the executable for the executable module contains malware. The attributes may comprise direct characteristics of the executable module or the executable (e.g., use of compiler, embedding of data, APIs, import strings). The attributes may be indirectly associated with the executable module or executable (e.g., origin of download or installation, inclusion to or exclusion of program files, whether a file corresponding to the executable is set to hidden or visible).

The learning engine may apply a neural network onto the input information (250). The neural network may include a set of inputs nodes, a set of hidden nodes, and a set of output nodes. Each input node may be connected to at least a subset of the hidden nodes. Each hidden node may be connected to at least a subset of the output nodes. Each connection between the nodes may be assigned a weight. The learning engine may use the one or more attributes for the executable module as the input information for the neural network. In response, the neural network may executable module the input information to generate a resultant (or output). The resultant may include one or more scores indicating the likelihood that the executable module of the executable corresponds to malware.

The learning engine may add a resultant of the neural network onto the database (255). As the captured executable module was determined to be not already stored in the database, the learning engine may store the resultant of the neural network onto the database. To store onto the database, the learning engine may generate an identifier for the executable module by calculating a hash value using binary data corresponding to the executable module. Once calculated, the learning engine may store the identifier for the executable module, the gathered input information, and the resultant onto the list of executable modules maintained on the database for future use.

In any event, the learning engine may add the resultant to an application initialization event (260). The learning engine may tag the one or more scores onto the application initialization event for the executable. The learning engine may insert or include the one or more scores into the application initialization event of the executable. In this manner, upon execution of the executable, the computing environment may retrieve the one or more scores for the rule engine to executable module.

A rule engine may apply a policy responsive to the application initialization event (265). Upon execution of the executable, the rule engine may be provided with the resultant added into the application initialization event for the executable. Using the one or more scores of the resultant, the rule engine may perform a set of actions in accordance with the policy. The policy may specify the set of actions to be performed by the rule action based on a specified range of values for each of the one or more scores.

Figure 2C:
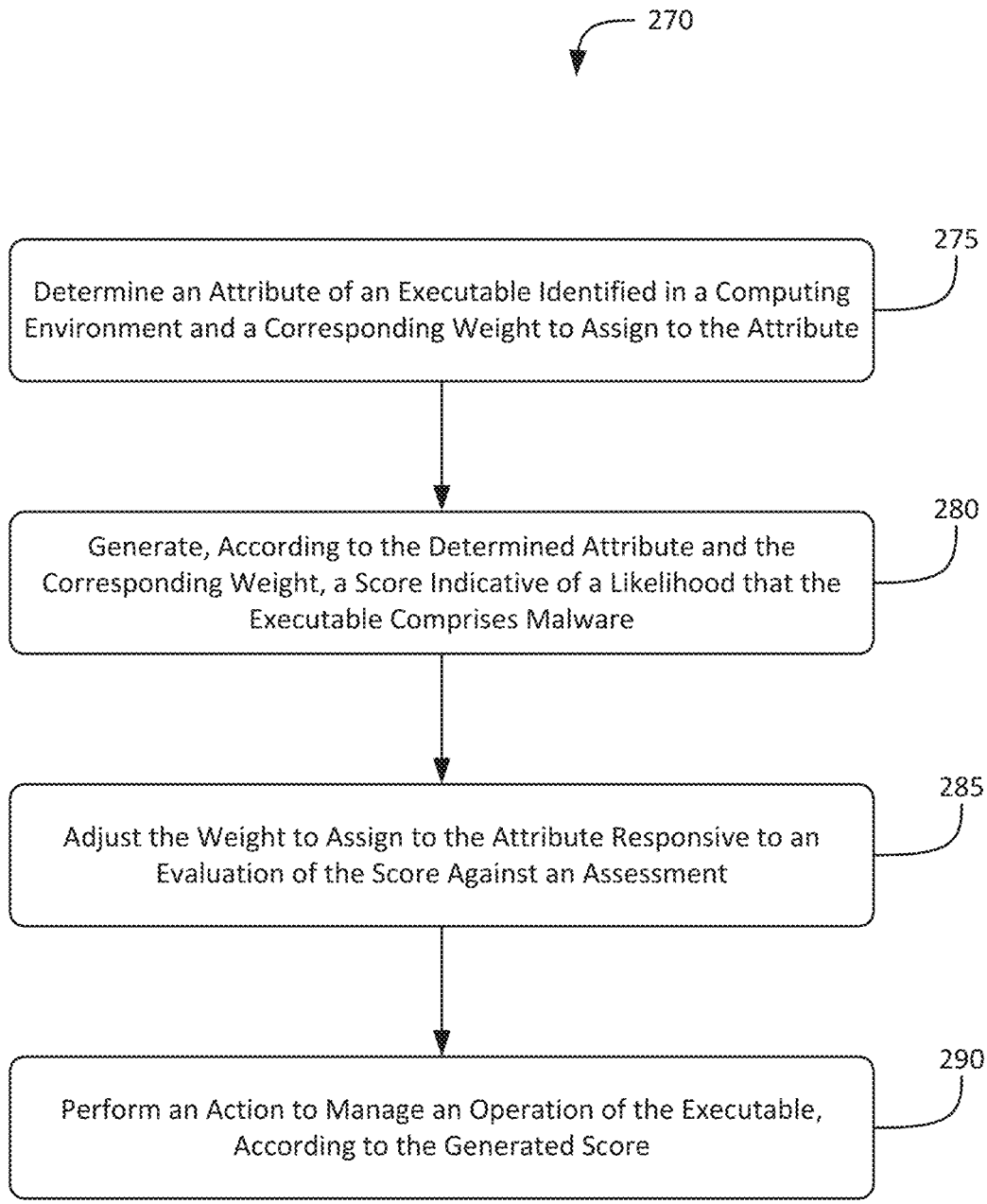
FIG. 2C is a flow diagram depicting an example embodiment of a method of determining a likelihood that an executable comprises malware.

Referring now to FIG. 2C, an embodiment of a method 270 for determining a likelihood that an executable comprises malware. The method 270 may be performed or be executed by any one or more components of system 100 as described in conjunction with FIGS. 1A-1D or system 200 as described in conjunction with FIG. 2A. In brief overview, a learning engine may determine one or more attributes of an executable identified in a computing environment and a corresponding weight to assign to the attribute(s) (275). The learning engine may generate, according to the determined attribute(s) and the corresponding weight, a score indicative of a likelihood that the executable comprises malware (280). A rule engine may adjust the weight(s) to assign to the attribute responsive to an evaluation of the score against an assessment (285). The rule engine may perform an action to manage an operation of the executable according to the generated score (290).

In further detail, referring to (275), and in some embodiments, a learning engine may determine an attribute of an executable identified in a computing environment and a corresponding weight to assign to the attribute. The attribute may be indicative of whether the executable contains malware. The executable may include a set of executable modules. Each executable module of the executable may include a set of execution paths. The learning may traverse through the set of executable modules and the set of execution paths for each executable module. By analyzing each execution path and executable module, the learning engine may acquire a set of attributes directly related to the executable (e.g., use of compiler, embedding of URLs or IP addresses, API used, standard import string, existence of packed or encrypted binary data, file size, etc.). In addition, the learning engine may parse metadata for the executable to obtain another set of attributes indirectly related to the executable (e.g., source or origin of the executable, inclusion to or exclusion of program files, property of file set to hidden or visible, etc.).

Once the attribute is identified, the learning engine may determine a corresponding weight for the attribute. The weight may be from a prediction model trained using a validation dataset (sometimes referred to as training data). The validation dataset may include a multitude of samples. Each sample may correspond to an executable with predetermined attributes and a likelihood that the executable contains malware or is benign. Initially, the weights of the prediction model linking inputs to outputs may be randomly seeded. By training with the validation dataset, the weights of the prediction model linking inputs to outputs may be adjusted to minimize error.

Referring to (280), and in some embodiments, the learning engine may generate, according to the determined attribute and the corresponding weight, a score indicative of a likelihood that the executable comprises malware. The learning engine may apply the attribute as an input to the prediction model trained using the validation model. With the identified weight for the attribute, the prediction model may in turn process the attribute to generate as output the score indicative of the likelihood that the executable contains malware. In some embodiments, the prediction model may, alternatively or in addition, generate an output or score indicative of the likelihood that the executable is benign (e.g., not malware). For instance, attributes indicative of an executable being potentially malware can be used to generate one score, while attributes indicative of an executable being potentially benign can be used to generate another score. The prediction model may generate an overall score incorporating both of these scores.

Referring to (285), and in some embodiments, a rule engine may adjust the weight to assign to the attribute responsive to an evaluation of the score against an assessment. The rule engine may receive the assessment from an administrator or another instance of the rule engine. The assessment may include an adjustment (e.g., an adjusted score) for the attribute. By evaluating or comparing the score generated by the learning engine with the adjusted score from the assessment, the rule engine may adjust the weight accordingly for the attribute.

Referring to (290), and in some embodiments, the rule engine may perform an action to manage an operation of the executable according to the generated score (290). The score can serve or operate as a prediction that an executable (or a component executable module/execution path) is of malicious nature or benign. Using the score, the rule engine may access a policy to determine which action or countermeasures to perform to manage or control the operation of the executable. The policy may specify which set of actions to perform to manager the operation of executable based on the score.

The description herein including modules emphasizes the structural independence of the aspects of the system components (e.g., the malware detection system 205 and its components and the computing environment 210 and its components), and illustrates one grouping of operations and responsibilities of the system 200. Other groupings that execute similar overall operations are understood within the scope of the present application. Modules may be implemented in hardware and/or as computer instructions on a non-transient computer readable storage medium, and modules may be distributed across various hardware or computer based components.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Non-limiting examples of various embodiments are disclosed herein. Features from one embodiments disclosed herein may be combined with features of another embodiment disclosed herein as someone of ordinary skill in the art would understand.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A system for determining a likelihood that an executable comprises malware, the system comprising:
   a server device comprising one or more processors coupled with memory, configured to:
   identify an executable to unpack for analysis in a first computing environment and to be executed in a second computing environment;
   determine that an identifier for the executable is not included in a database of indexed executables;
   determine, responsive to determining that the identifier is not included, a first attribute of a plurality of attributes identified from the executable unpacked in the first computing environment by the server device detecting initiation of the executable by a computing device containing the second computing environment, the initiation of the executable being in the second computing environment, and identifying, by the server device, the first attribute as a characteristic of the second computing environment while the executable is executing in the second computing environment, wherein the first environment comprises an operating environment on the server device, and wherein the second environment comprises an operating environment on a client device separate from the server device, wherein detecting the initiation of the executable comprises the server device detecting a process of the executable being run in the second computing environment;
   determine a remainder of the plurality of attributes identified from the executable unpacked in the first computing environment;
   determine a corresponding weight to assign to each of the plurality of attributes, each of the plurality of attributes indicative of a level of risk for the first second computing environment;
   assign a weight to an attribute corresponding to the use of a first API, the assigned weight being lower than one for assigning to an attribute corresponding to the use of a second API that is riskier than the first API;
   generate, according to the determined plurality of attributes and the corresponding weights, one or more scores indicative of a likelihood that the executable comprises malware;
   store, in the database of indexed executables, the identifier for the executable in association with the one or more scores; and
   perform an action to manage operation of the executable in the second computing environment according to the generated one or more scores.

2. The system of claim 1, wherein the one or more scores are indicative of at least one of: a likelihood of falsely identifying that the executable comprises malware, or a likelihood of falsely identifying that the executable is free of malware.

3. The system of claim 1, wherein the plurality of attributes comprises at least one of the executable: being associated with a non-standard compiler, using an embedded uniform resource locator (URL) or an external internet protocol (IP) address, using an unknown or unsafe application programming interface (API), using a non-standard import string, having packed or encrypted binary data, being smaller than a predetermined file-size, having no signature or root authority, being excluded from program files, being a hidden file, being downloaded from an external site, or having ability to encrypt files.

4. The system of claim 1, wherein the plurality of attributes comprises the executable being able to at least one of: start a process, start a process as a user, exit a process, open or access a process, suspend a process, open a process token, create a symbolic link, query a file system volume, access an environment string, create a thread, exit a thread, access a thread, suspend a thread, open a thread token, or create a named pipe, copy a file, print a file, or transmit a file out of the first computing environment.

5. The system of claim 1, wherein the first computing environment includes decrypted binary data of the executable unpacked in a testing computing environment and the second computing environment includes a runtime computing environment.

6. The system of claim 1, wherein the one or more processors are configured to evaluate the one or more scores against an assessment by a user.

7. The system of claim 6, wherein the one or more processors are configured to adjust, responsive to the evaluation, at least one of: a weight to assign to one of the plurality of attributes, or a mathematical function.

8. The system of claim 1, wherein the one or more processors are configured to perform the action, the action comprising automatically blocking an operation of the executable, adding or updating a rule to apply when the executable is detected, storing the one or more scores of the executable, sending the one or more scores to another learning engine or rule engine, sending a rule to block or control the operation of the executable, or sending one or more prompts to a user regarding the executable.

9. The system of claim 1, wherein the plurality of attributes comprises at least one of the executable: being associated with a standard compiler, not using an embedded uniform resource locator (URL) or an external internet protocol (IP) address, using a known or safe application programming interface (API), using a standard import string, not having packed or encrypted binary data, having a file-size of at least a predetermined value, having a legitimate signature, not being excluded from program files, being a visible file, being installed using a known or signed installer file.

10. The system of claim 1, wherein the one or more processors are further configured to generate the identifier for the executable based at least on a hash function of decrypted binary data unpacked in the first computing environment.

11. The system of claim 1, wherein the first attribute comprises one or more of a process of the executable, additional code loaded into the executable, one or more executable binaries, one or more executable libraries, one or more binary libraries, one or more dynamic libraries, and one or more dynamic link files.

12. A method for determining a likelihood that an executable comprises malware, the method comprising:
   identifying, by one or more processors, an executable unpacked in a first computing environment to be executed in a second computing environment, wherein the first environment comprises an operating environment on a server device, and wherein the second environment comprises an operating environment on a client device separate from the server device;

determining, by the one or more processors, that an identifier for the executable is not included in a database of indexed executables;

determining, by the one or more processors, a first attribute of a plurality of attributes identified from the executable unpacked in the first computing environment by the server device detecting initiation of the executable by a computing device containing the second computing environment, the initiation of the executable being in the second computing environment, and identifying, by the server device, the first attribute as a characteristic of the second computing environment while the executable is executing in the second computing environment, wherein detecting the initiation of the executable comprises the server device detecting a process of the executable being run in the second computing environment;

determining, by the one or more processors responsive to determining that the identifier is not included, a remainder of the plurality of attributes identified from the executable unpacked in the first computing environment;

determining, by the one or more processors, a corresponding weight to assign to each of the plurality of attributes, each of the plurality of attributes indicative of a level of risk for the second computing environment;

assigning, by the one or more processors, a weight to an attribute corresponding to the use of a first API, the assigned weight being lower than one for assigning to an attribute corresponding to the use of a second API that is riskier than the first API;

generating, by the one or more processors according to the determined plurality of attributes and the corresponding weights, one or more scores indicative of a likelihood that the executable comprises malware;

storing, by the one or more processors, in the database of indexed executables, the identifier for the executable in association with the one or more scores; and performing, by the one or more processors, an action to manage operation of the executable in the second computing environment, according to the generated one or more scores.

13. The method of claim 12, wherein the generated one or more scores are indicative of at least one of: a likelihood of falsely identifying that the executable comprises malware, or a likelihood of falsely identifying that the executable is free of malware.

14. The method of claim 12, wherein the plurality of attributes comprises at least one of the executable: being associated with a non-standard compiler, using an embedded uniform resource locator (URL) or an external internet protocol (IP) address, using an unknown or unsafe application programming interface (API), using a non-standard import string, having packed or encrypted binary data, being smaller than a predetermined file-size, having no signature or root authority, being excluded from program files, being a hidden file, being downloaded from an external site, or having ability to encrypt files.

15. The method of claim 12, wherein the plurality of attributes comprises the executable being able to at least one of: start a process, start a process as a user, exit a process, open or access a process, suspend a process, open a process token, create a symbolic link, query a file system volume, access an environment string, create an execution path, exit an execution path, access an execution path, suspend an execution path, open an execution path token, create a named pipe, copy a file, print a file, or transmit a file out of the first computing environment.

16. The method of claim 12, wherein the first computing environment includes decrypted binary data of the executable unpacked in a testing computing environment and the second computing environment includes a runtime computing environment.

17. The method of claim 12, further comprising:
evaluating, by the one or more processors, the one or more scores against an assessment by a user; and
adjusting, by the one or more processors responsive to the evaluation, at least one of: a weight to assign to one of the plurality of attributes, or a mathematical function.

18. The method of claim 12, wherein performing the action comprises automatically blocking an operation of the executable, adding or updating a rule to apply when the executable is detected, storing the one or more scores of the executable, sending the one or more scores, sending a rule to block or control the operation of the executable, or sending one or more prompts to a user regarding the executable.

* * * * *